US012562527B2

(12) United States Patent
Horning

(10) Patent No.: US 12,562,527 B2
(45) Date of Patent: Feb. 24, 2026

(54) SOCKET CONNECTOR FOR A CONNECTOR SYSTEM HAVING A LATCH FOR LATCHING TO A PIN COUPLED TO THE SOCKET CONNECTOR

(71) Applicant: TE Connectivity Solutions GmbH, Schaffhausen (CH)

(72) Inventor: Michael James Horning, Landisville, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 372 days.

(21) Appl. No.: 18/080,960

(22) Filed: Dec. 14, 2022

(65) Prior Publication Data

US 2023/0115610 A1 Apr. 13, 2023

Related U.S. Application Data

(63) Continuation-in-part of application No. 17/387,293, filed on Jul. 28, 2021, now Pat. No. 11,670,893.

(51) Int. Cl.
*H01R 13/627* (2006.01)

(52) U.S. Cl.
CPC ..... *H01R 13/6278* (2013.01); *H01R 13/6275* (2013.01)

(58) Field of Classification Search
None
See application file for complete search history.

(56) References Cited

U.S. PATENT DOCUMENTS 9,059,542 B2 * 6/2015 Oh ..................... H01R 13/6271
9,077,114 B2 * 7/2015 Oh ..................... H01R 13/641
10,122,117 B2 * 11/2018 Miller .................. H01R 11/282
11,670,893 B2 * 6/2023 Horning ............. H01R 13/6275 439/346
2013/0090000 A1 4/2013 Zhao
2015/0031225 A1 1/2015 Oh et al.
2016/0308304 A1 10/2016 Miller et al.
2022/0071040 A1 * 3/2022 Horning ............. H01R 12/7023

FOREIGN PATENT DOCUMENTS

| | | | |
|---|---|---|---|
| CN | 203242841 | U | 10/2013 |
| CN | 108232789 | A | 6/2018 |
| CN | 111999817 | A | 11/2020 |
| DE | 1818780 | U | 9/1960 |
| JP | H076818 | A | 1/1995 |
| WO | 2021114477 | A1 | 6/2021 |

OTHER PUBLICATIONS

Chinese Office Action with English translation thereof, dated Sep. 23, 2025 in Application No. 202218876597.0, 18 pages.

* cited by examiner

*Primary Examiner* — Oscar C Jimenez

(57) ABSTRACT

A socket connector includes a housing having a cavity and a pin access opening through the bottom open to the cavity configured to receive a pin. The housing includes a latch pocket open to the cavity. A socket is received in the cavity electrically connected to the pin and a cable to electrically connect the cable and the pin. The socket connector includes a latch movably received in the latch pocket between a latched position and a clearance position and configured to engage the pin to secure the socket connector to the pin. The latch includes a latching rib having a latching surface configured to engage the pin in the latched position and released from the pin in the clearance position to allow uncoupling of the socket connector from the pin.

18 Claims, 13 Drawing Sheets

SOCKET CONNECTOR FOR A CONNECTOR SYSTEM HAVING A LATCH FOR LATCHING TO A PIN COUPLED TO THE SOCKET CONNECTOR

CROSS REFERENCE TO RELATED APPLICATIONS

This application is a continuation-in-part of and claims benefit to U.S. application Ser. No. 17/387,293 filed Jul. 28, 2021 titled SOCKET CONNECTOR FOR A CONNECTOR SYSTEM, the subject matter of which is herein incorporated by reference in its entirety.

BACKGROUND OF THE INVENTION

The subject matter herein relates generally to a connector system.

A connector system, such as a power connector system, includes power connectors to provide electrical power to various system components. For example, the power connector system may be a used in a backplane power distribution application. Some known conventional power connector systems include a cable mounted socket electrically connected to a pin. The pin may be mounted to a circuit board or a bus bar to supply power to the circuit board or bus bar. The pin is a single-pole, quick connect and disconnect replacement for lug connections. The pin is reliable and offers better serviceability than bolt-fitted lugs. Known power connector systems are not without disadvantages. For example, the pin may have a current carrying limit. Additionally, unmating of the pin from the socket may be problematic.

A need remains for a cost effective and reliable socket connector for a connector system.

BRIEF DESCRIPTION OF THE INVENTION

In one embodiment, a socket connector is provided and includes a housing having a top, a bottom, a first side wall and a second side wall. The housing has a front and a rear. The housing includes a cavity. The housing includes a pin access opening through the bottom open to the cavity configured to receive a pin. The housing includes a latch pocket open to the cavity. The socket connector includes a socket received in the cavity and configured to be electrically connected to the pin. The socket has a terminating end configured to be coupled to a cable. The socket has a pin socket. The pin socket is aligned with the pin access opening of the housing to receive the pin. The socket configured to electrically connect the cable and the pin. The socket connector includes a latch movably received in the latch pocket and configured to engage the pin to secure the socket connector to the pin. The latch includes a latch release accessible exterior of the housing to release the latch. The latch includes a latching rib having a latching surface. The latch release moves the latch between a latched position and a clearance position. The latching rib configured to engage the pin in the latched position. The latching rib is released from the pin in the clearance position to allow uncoupling of the socket connector from the pin.

In another embodiment, a socket connector is provided and includes a housing having a top, a bottom, a first side wall and a second side wall. The housing has a front and a rear. The housing includes a cavity. The housing includes a pin access opening through the bottom open to the cavity configured to receive a pin. The housing includes a latch pocket open to the cavity. The housing includes a ramp surface extending into the latch pocket. The socket connector includes a socket received in the cavity and configured to be electrically connected to the pin. The socket has a terminating end configured to be coupled to a cable. The socket has a pin socket. The pin socket is aligned with the pin access opening of the housing to receive the pin. The socket configured to electrically connect the cable and the pin. The socket connector includes a latch movably received in the latch pocket and configured to engage the pin to secure the socket connector to the pin. The latch includes a latch release accessible exterior of the housing to release the latch. The latch includes a latching rib has a latching surface. The latch includes a latch arm engaging the ramp surface. The latch release moves the latch between a latched position and a clearance position. The latching rib configured to engage the pin in the latched position. The latching rib is released from the pin in the clearance position to allow uncoupling of the socket connector from the pin. The latch arm is deflected by the ramp surface when the latch release is pressed and moved to the clearance position. The latch arm moves along the ramp surface to return the latch to the latched position when the latch release is released.

In one embodiment, a connector system is provided and includes a pin connector having a substrate holding a pin. The pin includes a mating end has a groove. The connector system includes a socket connector removably coupled to the pin of the pin connector. The socket connector includes a housing having a top, a bottom, a first side wall and a second side wall. The housing has a front and a rear. The housing includes a cavity. The housing includes a pin access opening through the bottom open to the cavity configured to receive the pin. The housing includes a latch pocket open to the cavity. The socket connector includes a socket received in the cavity. The socket has a terminating end configured to be coupled to a cable. The socket has a pin socket aligned with the pin access opening of the housing to receive the pin. The pin socket is electrically connected to the pin to electrically connect the pin to the cable. The socket connector includes a latch movably received in the latch pocket between a latched position and a clearance position. The latch has a latching rib received in the groove of the pin to secure the socket connector to the pin in the latched position. The latch includes a latch release accessible exterior of the housing to release the latch from the latched position to the clearance position. The latching rib is released from the pin in the clearance position to allow uncoupling of the socket connector from the pin.

DETAILED DESCRIPTION OF THE INVENTION

Figure 1:
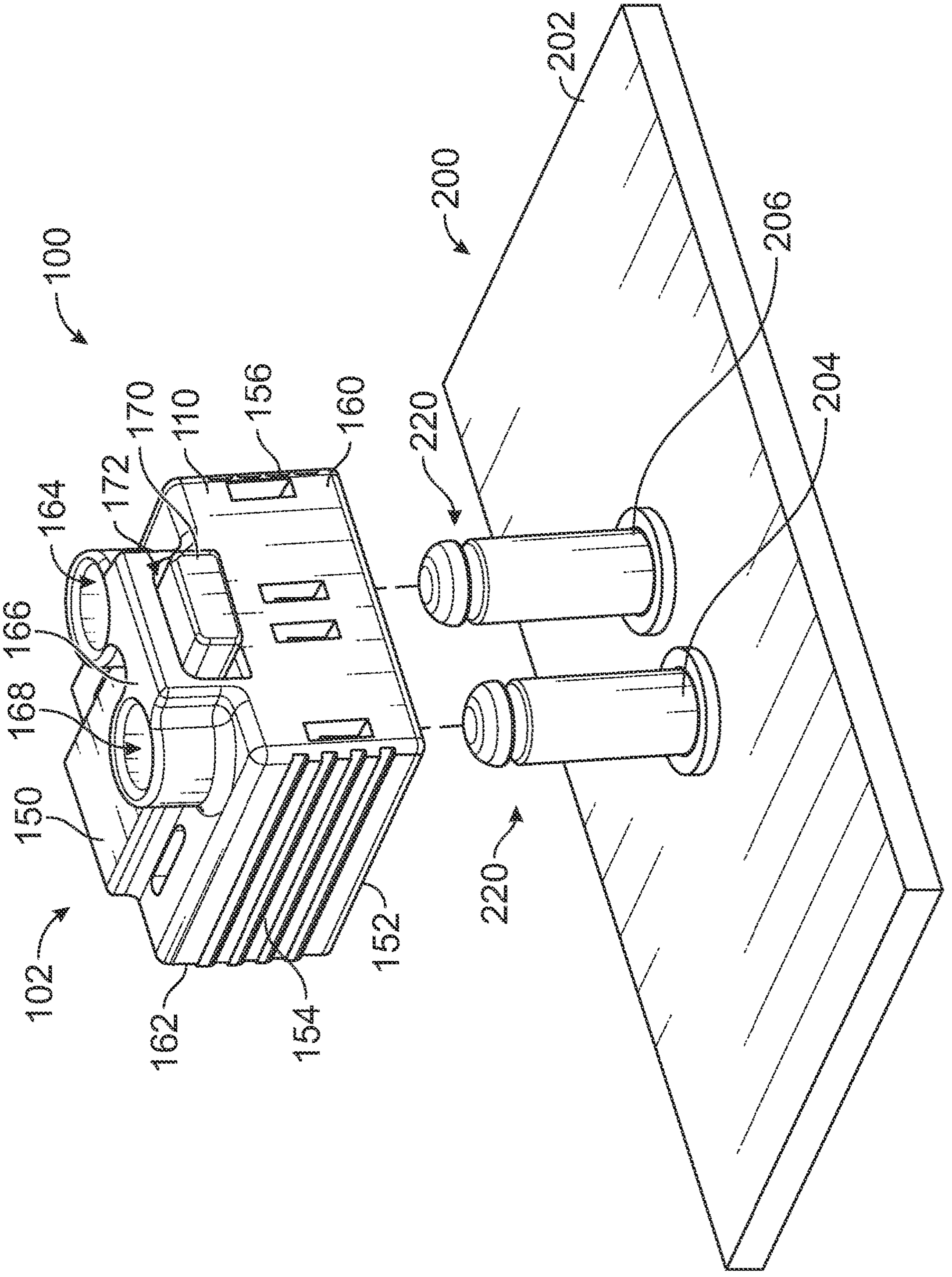
FIG. 1 is a perspective view of a connector system in accordance with an exemplary embodiment.
Figure 2:
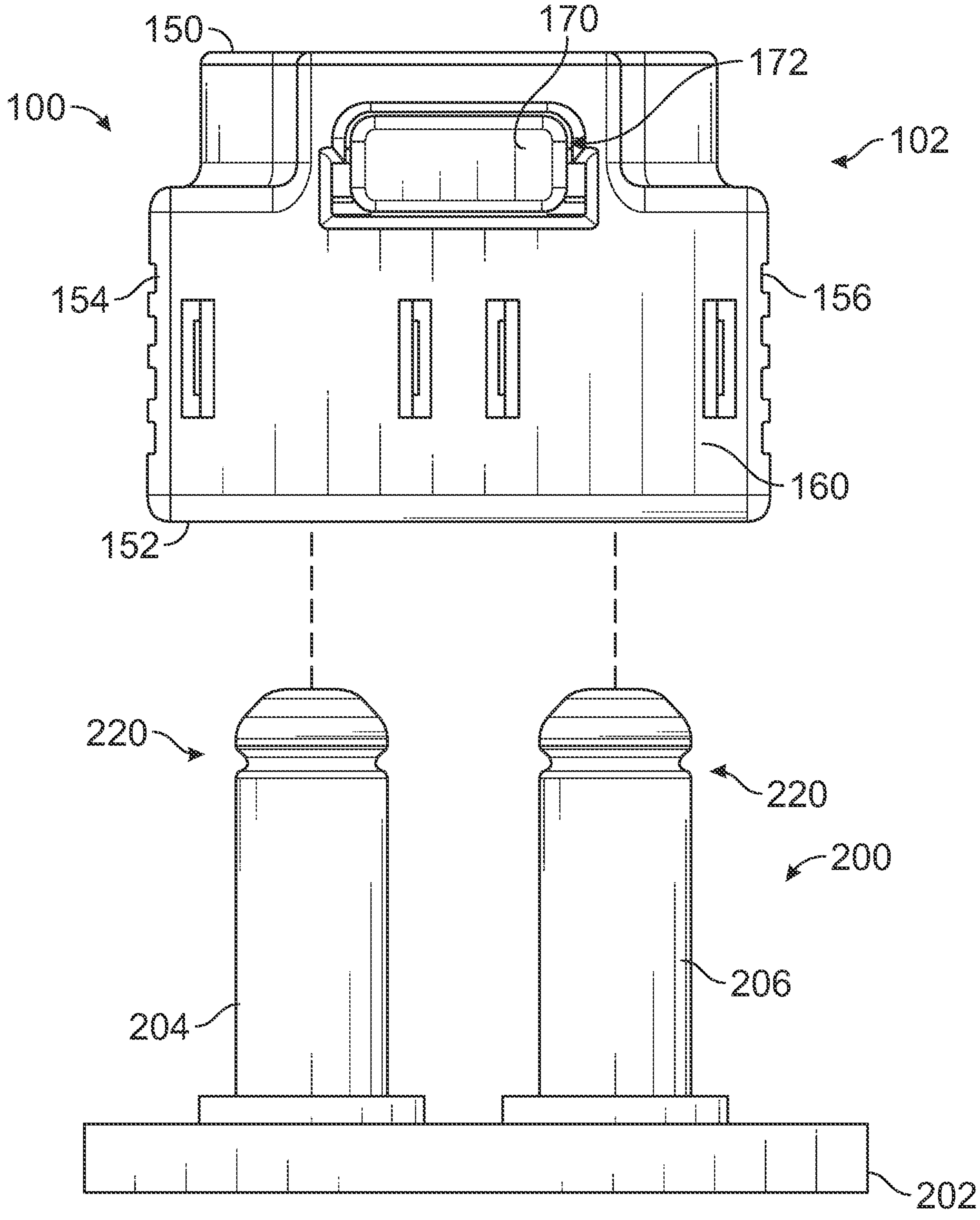
FIG. 2 is a front view of the connector system in accordance with an exemplary embodiment.

FIG. 1 is a perspective view of a connector system 100 in accordance with an exemplary embodiment. FIG. 2 is a front view of the connector system 100 in accordance with an exemplary embodiment. The connector system 100 includes a socket connector 102 and a pin connector 200. The connector system 100 may be a power connector system, such as a backplane power distribution system. The socket connector 102 is illustrated poised for coupling to the pin connector 200 in FIGS. 1 and 2. The socket connector 102 is configured to be removably coupled to the pin connector 200. For example, the socket connector 102 may be latchably coupled directly to the pins of the pin connector 200. In an exemplary embodiment, the socket connector 102 includes a pair of conductors and the pin connector 200 includes a pair of conductors. The plurality of conductors may be simultaneously mated and simultaneously unmated. However, the socket connector 102 and the pin connector 200 may include greater or fewer conductors in alternative embodiments, such as to increase or decrease the current or power configured to be transferred through the connectors 102, 200.

The pin connector 200 includes a substrate 202 holding a first pin 204 and a second pin 206. Providing multiple pins 204, 206 increases current carrying capacity of the connector system 100. In an exemplary embodiment, the first pin 204 is a power pin, such as a positive power pin and the second pin 206 is a power pin, such as a negative power pin, forming a power circuit. In other various embodiments, the first and second pins 204, 206 may both be positive power pins or both be negative power pins to increase current carrying capacity of the pin connector 200. In such embodiments, a second pin connector may be provided providing the other of the positive or negative power pins. In other various embodiments, the first pin 204 and/or the second pin 206 may be a signal pin or a ground pin.

In various embodiments, the substrate 202 is a circuit board. The pins 204, 206 may be coupled to the circuit board by a press-fit connection or by using screws. In other various embodiments, the substrate 202 is a busbar. The pins 204, 206 may be coupled to the busbar using screws or swaging the pins 204, 206. Optionally, multiple substrates 202 may be provided with each substrate holding a respective pin 204, 206.

Figure 3:
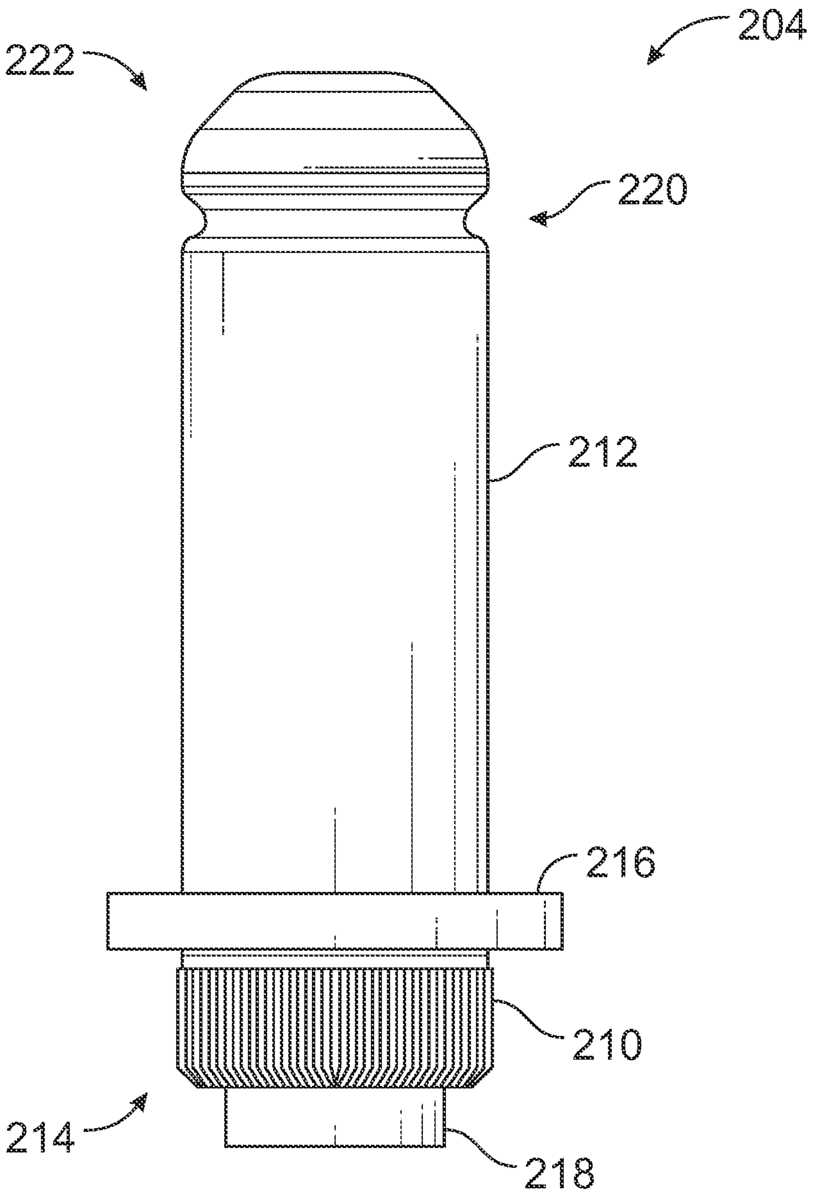
FIG. 3 is a side view of the pin is shown in accordance with an exemplary embodiment.

In an exemplary embodiment, the first and second pins 204, 206 are identical. With additional reference to FIG. 3, a side view of the pin 204 is shown in accordance with an exemplary embodiment. The pin 204 includes a base 210 mounted to the substrate 202 and a pin 212 extending from the base 210. The pin 212 extends to a mating end 214. In an exemplary embodiment, the base 210 is provided at a bottom of the pin 204 and the mating end 214 is provided at a top of the pin 204. In various embodiments, the pin 212 is generally cylindrical. In an exemplary embodiment, the base 210 includes a flange 216, configured to be coupled to the substrate 202. The flange 216 is seated on an upper surface of the substrate 202. The flange 216 may be electrically connected to the substrate 202. In an exemplary embodiment, the base 210 is configured to extend through an opening in the substrate 202. The base 210 may be press-fit into the opening of the substrate 202. The base 210 may include a knurled surface or crush ribs along the exterior for mechanical and electrical connection to the substrate 202. Optionally, a fastener 218, such as a screw, is coupled to the bottom end of the base 210 below the substrate 202.

In an exemplary embodiment, the pin 212 includes a groove 220 extending around the circumference of the pin 212. The pin 212 is stepped inward to form the groove 220. The groove 220 may be V-shaped. The groove 220 forms a surface for latchably coupling the socket connector 102 to the pin 212. The groove 220 is located proximate to a distal end 222 of the pin 212. For example, the groove 220 is located in the top half of the pin 212 and may be located immediately adjacent the distal end 222. In an exemplary embodiment, the pin 212 is chamfered or cupped at the distal end 222 to provide a lead-in surface for mating with the socket connector 102. In various embodiments, the pin 212 may be machined, such as being screw machined, to form the groove 220.

Figure 4:
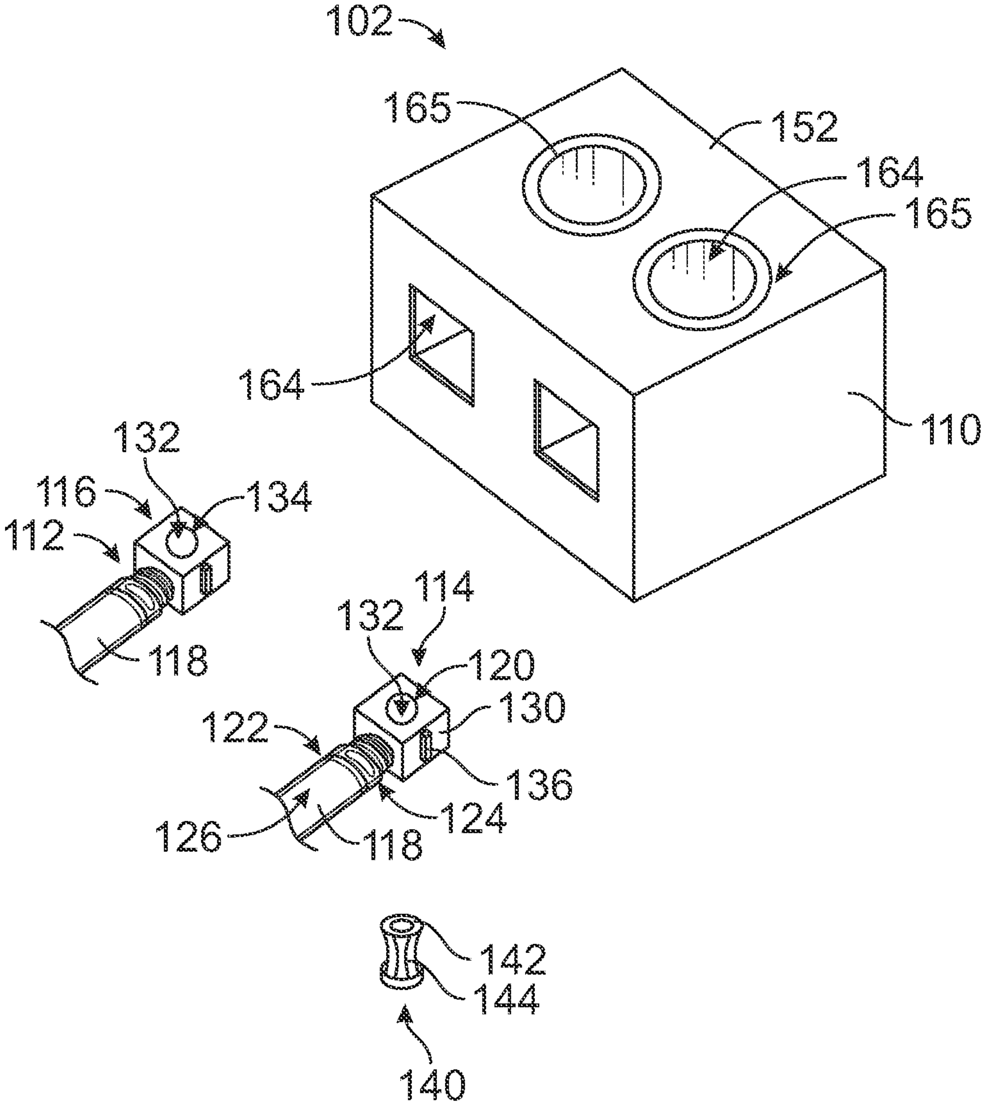
FIG. 4 is a bottom perspective view of the socket connector in accordance with an exemplary embodiment.

With reference back to FIGS. 1 and 2, the socket connector 102 includes a housing 110 holding one or more sockets 112 (shown in FIG. 4). The housing 110 receives the sockets 112 and allows mating and unmating of the sockets 112 simultaneously with the pin connector 200. The housing 110 is manufactured from a dielectric material, such as a plastic material. The housing 110 may be molded, such as being injection molded. The housing 110 includes a top 150, a bottom 152, a first side wall 154, and a second side wall 156. The housing 110 extends between a front 160 and a rear 162.

The housing 110 includes one or more cavities 164 that receive the sockets 112. In various embodiments, the housing 110 may include a pair of the cavities 164, such as a first cavity and a second cavity that receive the pair of sockets 112. The cavities 164 may be separated by a separating wall 166, which electrically isolates the sockets 112. The housing 110 may include retaining features that retain the socket 112 in the cavities 164, such as latches, tabs, recesses, shoulders, and the like formed in the walls defining the cavities 164. When the sockets 112 are received in the cavities 164, the housing 110 may completely enclose the sockets 112 for making a touch safe covering for the sockets 112. For example, tops, bottoms, sides, fronts and/or rears of the sockets 112 may be covered by the housing 110. The sockets 112 do not require secondary insulative coverings to make the sockets 112 touch safe. Rather, the housing 110 insulates the conductive portions of the sockets 112 without the need for secondary insulative coverings. In an exemplary embodiment, the cavities 164 are open at the top 150 and include upper openings 168. The upper openings provide access to the cavities 164. The upper openings 168 allow visual inspection of the pins 204, 206 during mating, such as for aligning the housing 110 with the pins 204, 206. The upper openings 168 may be provided at ends of extensions at the top 150.

In an exemplary embodiment, the socket connector 102 includes one or more latches 170 used to couple the socket connector 102 to the pin connector 200. The latch 170 is received in a latch pocket 172 in the housing 110. In an exemplary embodiment, the latch 170 is configured to directly engage the pins 204, 206. For example, the latch 170 is received in the grooves 220 of the pins 204, 206 to retain the socket connector 102 on the pins 204, 206. In an exemplary embodiment, the latch 170 is movably coupled to the housing 110. For example, the latch 170 may be slidable in the latch pocket 172. The latch 170 is movable between a latched position and a clearance position. The latch 170 is accessible at an exterior of the housing 110, such as at the front 160. The latch 170 is deflected, such as being pressed inward, to release the socket connector 102 from the pin connector 200.

FIG. 4 is a bottom perspective view of the socket connector 102 in accordance with an exemplary embodiment. The socket connector 102 includes the housing 110 and the sockets 112. The sockets 112 are configured to be received in the housing 110. The sockets 112 may be positioned in the housing 110 to interface with the pins 204, 206 (shown in FIGS. 1 and 2). For example, the sockets 112 may be received in the cavities 164 to electrically connect to the pins 204, 206.

In the illustrated embodiment, the socket connector 102 includes a pair of the sockets 112, which includes a first socket 114 and a second socket 116. Optionally, the first and second sockets 114, 116 may be identical. Each socket 112 is electrically connected to a cable 118. The cable 118 may be a power cable. The first and second sockets 114, 116 are configured to be electrically connected to the first and second pins 204, 206, respectively. In an exemplary embodiment, the sockets 114, 116 are power sockets.

The sockets 114, 116 are manufactured from a conductive material, such as a copper or aluminum material. In various embodiments, the sockets 114, 116 are machined parts. In alternative embodiments, the sockets 114, 116 may be diecast, extruded, molded or may be a stamped and formed parts. The sockets 114, 116 each extend between a mating end 120 and a terminating end 122. The terminating end 122 is coupled to the cable 118. In an exemplary embodiment, the sockets 114, 116 each include a crimp barrel 124 at the terminating end 122. The crimp barrel 124 is hollow forming a cable socket 126 that receives the cable 118. The crimp barrel 124 is crimped to the cable 118, such as using a crimping tool. The terminating end 122 may be coupled to the cable 118 by other means in alternative embodiments. For example, the terminating end 122 may include a weld pad welded to the end of the cable 118.

The sockets 114, 116 each include a main body 130 at the mating end 120. The main body 130 includes a pin socket 132 configured to receive the corresponding pin 212 (shown in FIG. 3). The main body 130 includes an opening 134 at a bottom thereof that is open to the pin socket 132. The top of the main body 130 may additionally or alternatively include the opening 134. The top of the main body 130 may be closed in other various embodiments. In the illustrated embodiment, the pin socket 132 extends along an axis that is perpendicular to the cable 118. However, other orientations are possible in alternative embodiments. For example, the pin socket 132 may extend along an axis that is parallel to the cable 118. In an exemplary embodiment, the main body 130 includes retention features 136 used to retain the sockets 114, 116 in the housing 110. For example, the retention features 136 may be barbs or ribs formed along sides of the main body 130. Other types of retention features may be used in alternative embodiments.

In an exemplary embodiment, the sockets 114, 116 each include a torsional band contact 140 received in the pin socket 132. The torsional band contact 140 includes rings or bands 142 around the top and a bottom of the torsional band contact 140 and spring beams 144 extending between the bands 142. The spring beams 144 are deflectable relative to each other the spring beams 144 extend inward toward an interior of the torsional band contact 140. For example, the torsional band contact 140 may have an hourglass shape. The spring beams 144 include separable mating interfaces configured to engage and electrically connect to the pin 212 with the pin 212 is plugged into the pin socket 132 in the torsional band contact 140.

In an exemplary embodiment, the housing 110 includes pin access openings 165 at the bottom 152. The pin access openings 165 provide access to the cavities 164. In an exemplary embodiment, the sockets 114, 116 are arranged in the housing 110 such that the pin sockets 132 are aligned with the pin access openings 165 to receive the pins 204, 206. In an exemplary embodiment, the housing 110 includes guide surfaces at the pin access openings 165 to guide loading of the pins 204, 206 into the pin access openings 165. For example, the guide surfaces are angled or chamfered surfaces used to funnel the pins 204, 206 into the pin access openings 165. The guide surfaces provide a larger catch radius for receiving the pins 204, 206 to guide mating of the socket connector 102 with the pin connector 200.

Figure 5:
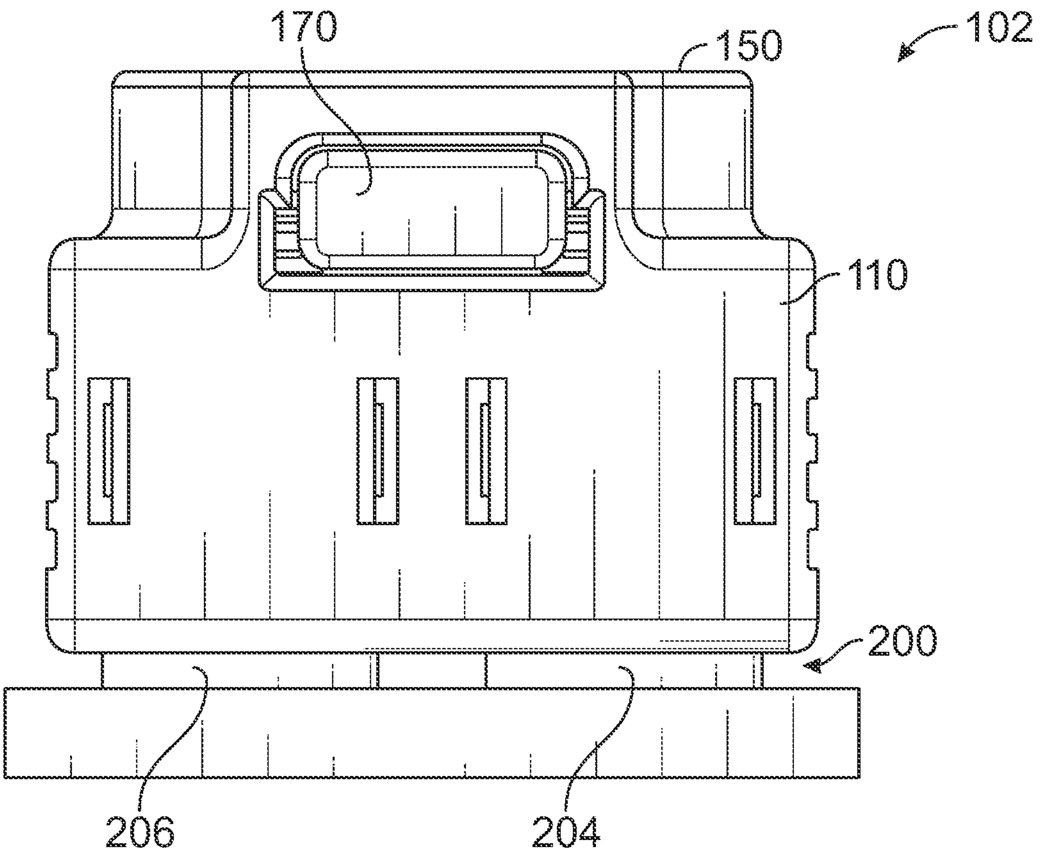
FIG. 5 is a front view of the socket connector coupled to the pin connector in accordance with an exemplary embodiment.
Figure 6:
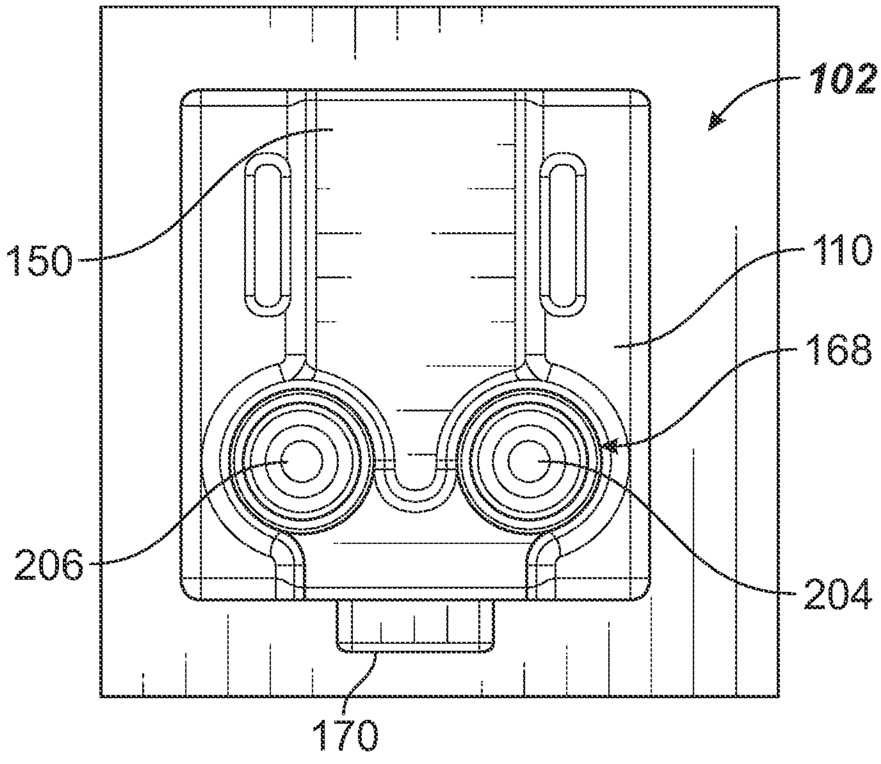
FIG. 6 is a top view of the socket connector coupled to the pin connector in accordance with an exemplary embodiment.

FIG. 5 is a front view of the socket connector 102 coupled to the pin connector 200 in accordance with an exemplary embodiment. FIG. 6 is a top view of the socket connector 102 coupled to the pin connector 200 in accordance with an exemplary embodiment. The socket connector 102 is coupled directly to the pin connector 200. The latch 170 is latchably coupled directly to the pins 204, 206 of the pin connector 200. The latch 170 may be pressed inward to release the socket connector 102 from the pin connector 200. As shown in FIG. 6, the pins 204, 206 are visible through the top 150 of the housing 110, such as through the upper openings 168.

Figure 7:
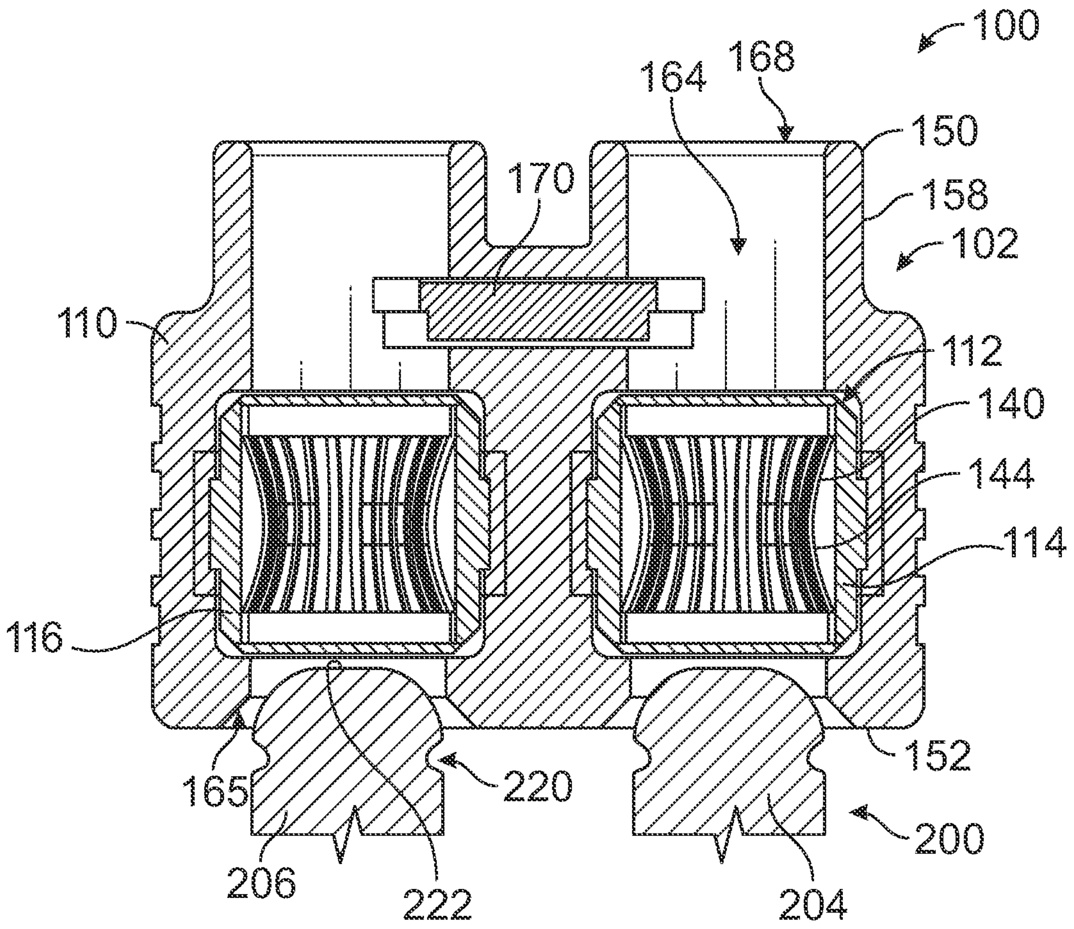
FIG. 7 is a cross sectional view of a portion of the connector system showing the socket connector poised for mating with the pin connector in accordance with an exemplary embodiment.
Figure 8:
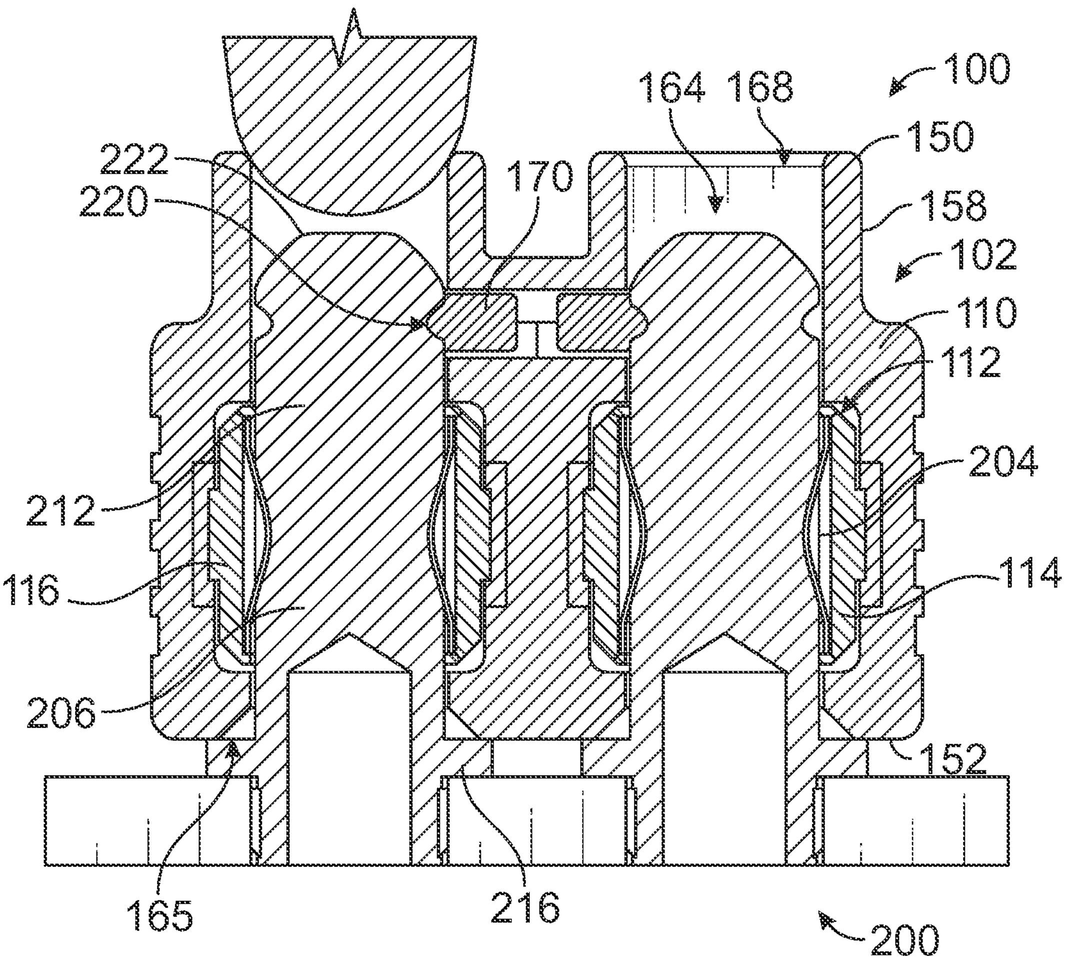
FIG. 8 is a cross sectional view of the connector system showing the socket connector coupled to the pin connector in accordance with an exemplary embodiment.

FIG. 7 is a cross sectional view of a portion of the connector system 100 showing the socket connector 102 poised for mating with the pin connector 200. FIG. 8 is a cross sectional view of the connector system 100 showing the socket connector 102 coupled to the pin connector 200. When assembled, the sockets 114, 116 are located in the cavities 164 to interface with the pins 204, 206. The spring beams 144 of the torsional band contacts 140 extend inward into the interior spaces of the sockets 114, 116 to engage the pins 204, 206.

During mating, the pin access openings 165 are aligned with the distal ends 222 of the pins 204, 206. The upper openings 168 allow visual alignment with the pins 212. The housing 110 is lowered over the pins 204, 206 to load the pins 204, 206 into the cavities 164. In an exemplary embodiment, the housing 110 is lowered onto the pin connector 200 until the bottom 152 is seated on the flange 216 and/or the substrate 202. During mating, the latch 170 engages the pins 204, 206. The pins 204, 206 may be shaped (for example, rounded or chamfered at the top) to engage the latch 170 and actuate or move the latch to a clearance position to pass the latch 170 along the ends of the pins 204, 206 to align the latch 170 with the grooves 220. The latch 170 may clip or snap couple to the pins 204, 206 in the grooves 220. In the latched position, the latch 170 is received in the grooves 220 to secure the socket connector 102 to the pin connector 200. The latch 170 is used to lock the socket connector 102 onto the pins 204, 206 without the need for separate mounting hardware, such as fasteners used to secure the housing 110 to the substrate 202. As such, the housing 110 may be manufactured with a narrow width. For example, the walls along the cavities 164 outside of the pins 212 may be relatively thin, leading to a small footprint for the socket connector 102, which allows other components to be provide on the substrate 202 in close proximity to the pins 204, 206 (particularly when compared to a housing having mounting lugs or other mounting features along the sides of the housing 110 used for mounting the socket connector 102 to the substrate 202).

In an exemplary embodiment, the housing 110 includes towers or extensions 158 at the top 150 of the housing 110. The extensions 158 elevate the upper openings 168 a safe distance above the distal ends 222 of the pins 212. The extensions 158 make the housing 110 touch safe by preventing inadvertent touching or shorting to the pins 204, 206.

Figure 9:
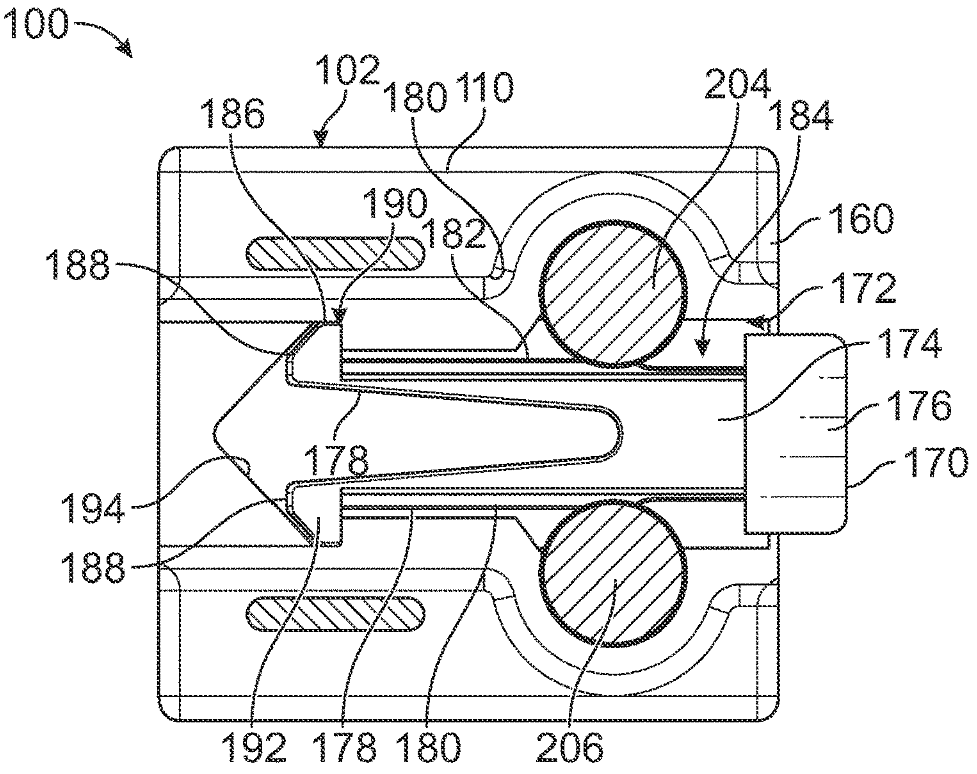
FIG. 9 is a cross sectional view of a portion of the connector system showing the socket connector coupled to the pin connector with the latch in a latched position in accordance with an exemplary embodiment.
Figure 10:
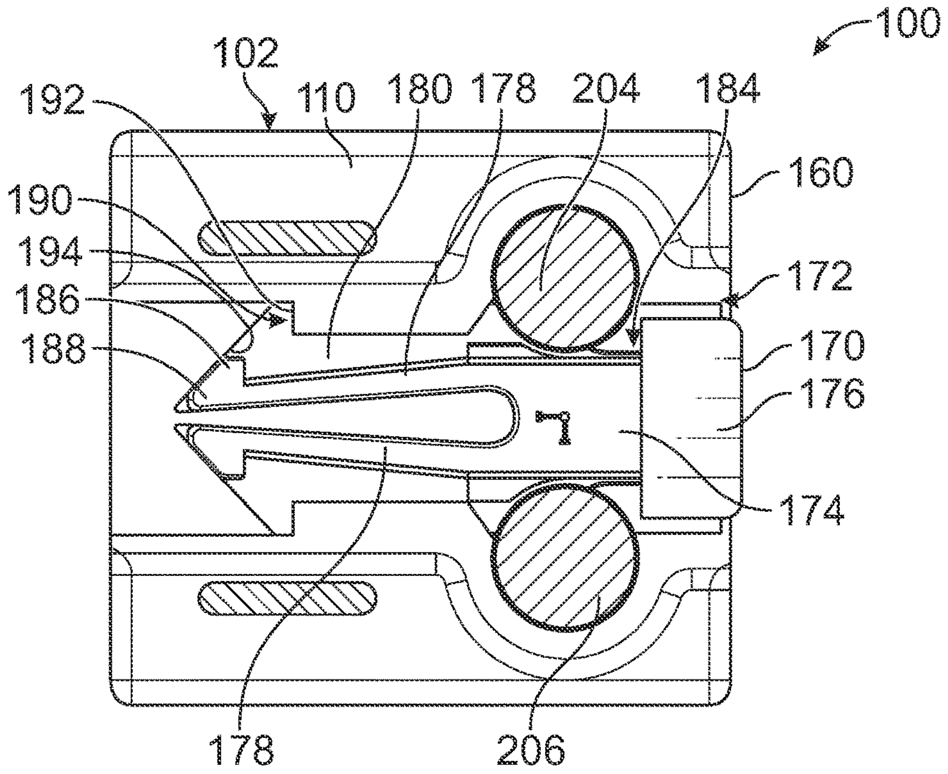
FIG. 10 is a cross sectional view of the connector system showing the socket connector coupled to the pin connector with the latch in a clearance position in accordance with an exemplary embodiment.

FIG. 9 is a cross sectional view of a portion of the connector system 100 showing the socket connector 102 coupled to the pin connector 200 with the latch 170 in a latched position. FIG. 10 is a cross sectional view of the connector system 100 showing the socket connector 102 coupled to the pin connector 200 with the latch 170 in a clearance position. The latch 170 is movably received in the latch pocket 172. For example, the latch 170 may be pressed inward to release the latch 170 from the pins 204, 206 of the pin connector 200. The latch 170 is guided between the latched position and the clearance position by the housing 110 in the latch pocket 172. In the latched position, the latch 170 engages the pins 204, 206 to prevent pull off or separation of the socket connector 102 from the pin connector 200. In the illustrated embodiment, the single latch 170 is latchably coupled to both the pins 204, 206 to secure the socket connector 102 to the pin connector 200. However, in alternative embodiments, the latch 170 may be coupled to one of the pins 204, 206 or multiple latches 170 may be provided each coupled to the corresponding pin 204, 206.

The latch 170 includes a main body 174, a latch release 176, and one or more latch arms 178. In the illustrated embodiment, the latch release 176 is provided at a front of the main body 174 and the latch arms 178 extend from a rear of the main body 174. The latch release 176 may be a push button. The latch release 176 is exposed at the exterior of the housing 110, such as at the front 160 of the housing 110. The latch release 176 is actuated (unlatched) by pushing the latch 170 inward from the latched position to the clearance position. Other types of actuating movements are possible in alternative embodiments.

In the illustrated embodiment, the latch 170 includes a pair of the latch arms 178. The latch arms 178 are configured to be latchably coupled to the pin connector 200, such as the pins 204, 206. The latch arms 178 are deflectable. The latch arms 178 may be deflected inward (for example, toward each other) during mating and unmating of the socket connector 102 to the pin connector 200. The latch arms 178 may be deflected automatically (for example, without pressing the latch release 176), such as by the pins 204, 206 during mating of the socket connector 102 to the pin connector 200. For example, as the socket connector 102 is pressed downward onto the pin connector 200, the distal ends of the pins 204, 206 (which may be rounded) engage the latch arms 178 and deflect the latch arms 178 inward until the latch arms 178 are aligned with the grooves 220. The latch arms 178 may snap outward to clip or latch to the grooves 220. The latch arms 178 may be deflected using the latch release 176, such as being squeezed inward when actuated to release the latch arms 178 from the pins 204, 206. The latch arms 178 may be latchably coupled to the housing 110. In an exemplary embodiment, the latch arms 178 are configured to be deflected inward by the housing 110 as the latch 170 is actuated and pressed inward to the clearance position. For example, as the latch 170 is moved rearward, the latch arms 178 engage the housing 110 and are flexed inward toward each other to release from the pins 204, 206. The latch arms 178 are moved from a blocking or latched position to the clearance position when the latch release 176 is actuated (for example, when the latch release 176 is pressed by an operator). In an exemplary embodiment, the latch arms 178 engage the housing 110 and return the latch 170 from the released position to the latched position when the latch release 176 is released by the operator.

Each latch arm 178 includes a latching rib 180 along a side of the latch arm 178, such as along an outer edge of the latch arm 178. The latching rib 180 has a latching surface 182 (for example, an upper surface) configured to latchably engage the corresponding pin 204, 206. The latching rib 180 is sized and shaped to interface with the pin 204, 206, such as to fit in the groove 220 (shown in FIG. 8). The latching rib 180 may be V-shaped in various embodiments. FIG. 8 illustrates the latching rib 180 in the groove 220 of the pin 204, 206 with the latching surface 182 engaging the pin 204, 206 to secure the socket connector 102 on the pin connector 200. The latching rib 180 is deflectable with the latch arm 178, which may unlatch the latching rib 180 when the latch arm 178 is deflected.

The latching rib 180 extends along a length of the latch arm 178. The latching rib 180 may extend along a length of the main body 174. In the illustrated embodiment, the latching rib 180 ends short of the latch release 176. For example, a window 184 is provided between the latching rib 180 and the latch release 176. The window 184 may extend along a length of the main body 174. Optionally, the window 184 may extend along a length of the latch arm 178 (for example, when the latching rib 180 is short of the main body 174). The latching rib 180 is disengaged from (unlatched from) the pin 204, 206 in the clearance position. For example, the window 184 is configured to be aligned with the pin 204, 206 when the latch 170 is moved to the clearance position. The socket connector 102 is able to move vertically along the pins 204, 206 in the clearance position when the windows 184 are aligned with the pins 204, 206.

Each latch arm 178 includes a latching finger 186 at a distal end 188 of the latch arm 178. The latching finger 186 is configured to be latchably coupled to the housing 110. For example, the latching finger 186 may be received in a notch 190 in the housing 110 to engage a catch surface 192 of the housing 110. The latching finger 186 prevents pull-out of the latch 170 from the housing 110. In an exemplary embodiment, the housing 110 includes a ramp surface 194 at the rear of the latch pocket 172. The distal end 188 of the latch arm 178 engages the ramp surface 194. The ramp surface 194 is configured to deflect the latch arm 178 inward as the distal end 188 rides along the ramp surface 194. For example, as the latch 170 is actuated (pressed rearward to the clearance position of FIG. 10), the distal end 188 slides along the ramp surface 194 to deflect the latch arm 178 inward. The deflection elastically deforms the latch arm 178 creating an internal spring force or biasing force in the latch arm 178. When the latch release 176 is released, the latch arms 178 spread out to return to the undeflected state, which causes the distal ends 188 of the latch arms 178 to ride up the ramp surfaces 194 and return the latch 170 to the latched position (FIG. 9).

The latch release 176 is easily accessible from the exterior of the housing 110 to allow quick and easy unlatching of the socket connector 102 from the pin connector 200. The latch 170 is slid in a linear actuation direction (for example, rearward) when the latch release 176 is actuated. The sliding movement of the latch 170 releases the latching ribs 180 and aligns the windows 184 with the pins 204, 206 to release the latch 170 from connection with the pins 204, 206. Thus, the socket connector 102 may be removed from the pins 204, 206 without obstruction.

Figure 11:
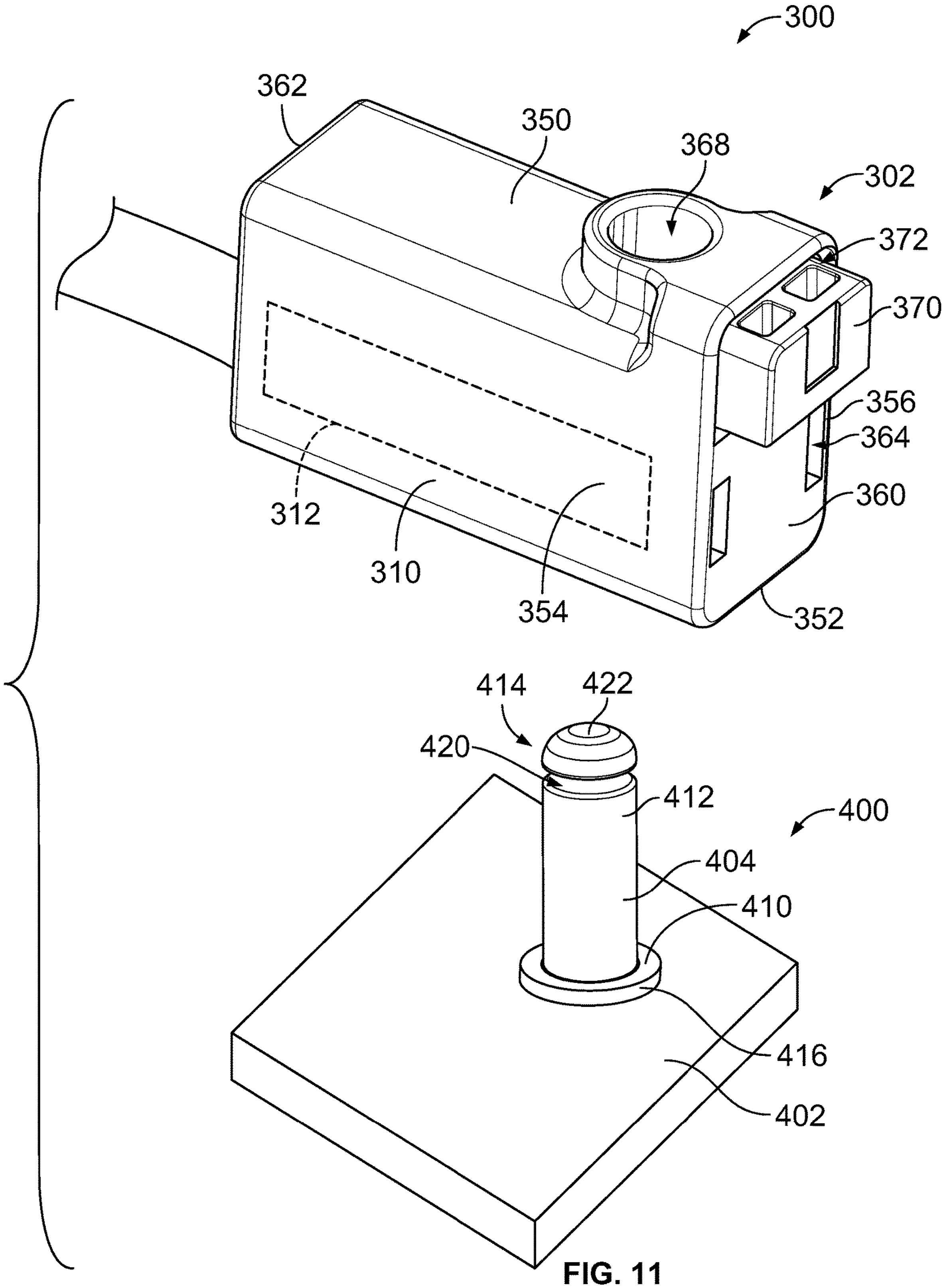
FIG. 11 is a perspective view of a connector system in accordance with an exemplary embodiment.

FIG. 11 is a perspective view of a connector system 300 in accordance with an exemplary embodiment. The connector system 300 is similar to the connector system 100 shown in FIG. 1; however, the connector system 300 is a single pole system for mating a single cable with a single pin rather than a dual pole system.

The connector system 300 includes a socket connector 302 and a pin connector 400. The connector system 300 may be a power connector system, such as a backplane power distribution system. The socket connector 302 is illustrated poised for coupling to the pin connector 400. The socket connector 302 is configured to be removably coupled to the pin connector 400. For example, the socket connector 302 may be latchably coupled directly to the pin of the pin connector 400. In an exemplary embodiment, multiple socket connectors 302 may be provided and separately coupled to the corresponding pins of the pin connector 400.

The pin connector 400 includes a substrate 402 holding a pin 404. The pin 404 is a power pin. The pin 404 may be similar to the pin 204 (shown in FIG. 3. In various embodiments, the substrate 402 is a circuit board. The pin 404 may be coupled to the circuit board by a press-fit connection or by using screws. In other various embodiments, the substrate 402 is a busbar. The pin 404 may be coupled to the busbar using screws or swaging the pin 404. Optionally, multiple substrates 402 may be provided with each substrate holding a respective pin 404.

The pin 404 includes a base 410 mounted to the substrate 402 and an upstanding pin portion 412 extending from the base 410. The pin portion 412 extends to a mating end 414. In an exemplary embodiment, the base 410 is provided at a bottom of the pin 404 and the mating end 414 is provided at a top of the pin 404. In various embodiments, the pin portion 412 is generally cylindrical. In an exemplary embodiment, the base 410 includes a flange 416 configured to be coupled to the substrate 402. The flange 416 is seated on an upper surface of the substrate 402. The flange 416 may be electrically connected to the substrate 402. In an exemplary embodiment, the base 410 is configured to extend through an opening in the substrate 402. The base 410 may be press-fit into the opening of the substrate 402. The base 410 may include a knurled surface or crush ribs along the exterior for mechanical and electrical connection to the substrate 402. Optionally, a fastener (not shown), such as a screw, is coupled to the bottom end of the base 410 below the substrate 402.

In an exemplary embodiment, the pin 404 includes a groove 420 extending around the circumference of the pin portion 412. The pin portion 412 is stepped inward to form the groove 420. The groove 420 may be V-shaped. The groove 420 forms a surface for latchably coupling the socket connector 302 to the pin 404. The groove 420 is located proximate to a distal end 422 of the pin 404. For example, the groove 420 is located in the top half of the pin portion 412 and may be located immediately adjacent the distal end 422. In an exemplary embodiment, the pin portion 412 is chamfered or cupped at the distal end 422 to provide a lead-in surface for mating with the socket connector 302. In various embodiments, the pin 404 may be machined, such as being screw machined, to form the groove 420.

The socket connector 302 includes a housing 310 holding a socket 312 (shown in phantom). The housing 310 receives the socket 312 and allows mating and unmating of the socket 312 with the pin 404. The housing 310 is manufactured from a dielectric material, such as a plastic material. The housing 310 may be molded, such as being injection molded. The housing 310 includes a top 350, a bottom 352, a first side wall 354, and a second side wall 356. The housing 310 extends between a front 360 and a rear 362.

The housing 310 includes a cavity 364 that receive the socket 312. The housing 310 may include retaining features that retain the socket 312 in the cavity 364, such as latches, tabs, recesses, shoulders, and the like formed in the walls defining the cavity 364. When the socket 312 is received in the cavity 364, the housing 310 may completely enclose the socket 312 for making a touch safe covering for the socket 312. For example, the top, bottom, sides, front and/or rear of the socket 312 may be covered by the housing 310. The socket 312 does not require a secondary insulative covering to make the socket 312 touch-safe. Rather, the housing 310 insulates the conductive portion of the socket 312 without the need for secondary insulative coverings. In an exemplary embodiment, the cavity 364 is open at the top 350 and includes an upper opening 368. The upper opening 368 provides access to the cavity 364. The upper opening 368 allows visual inspection of the pins 404 during mating, such as for aligning the housing 310 with the pin 404. The upper opening 368 may be provided at an end of an extension at the top 350.

In an exemplary embodiment, the socket connector 302 includes a latch 370 used to couple the socket connector 302 to the pin connector 400. The latch 370 is received in a latch pocket 372 in the housing 310. In an exemplary embodiment, the latch 370 is configured to directly engage the pin 404. For example, the latch 370 is received in the groove 420 of the pin 404 to retain the socket connector 302 on the pin 404. In an exemplary embodiment, the latch 370 is movably coupled to the housing 310. For example, the latch 370 may be slidable in the latch pocket 372. The latch 370 is movable between a latched position and a clearance position. The latch 370 is accessible at an exterior of the housing 310, such as at the front 360. The latch 370 is deflected, such as being pressed inward, to release the socket connector 302 from the pin connector 400.

Figure 12:
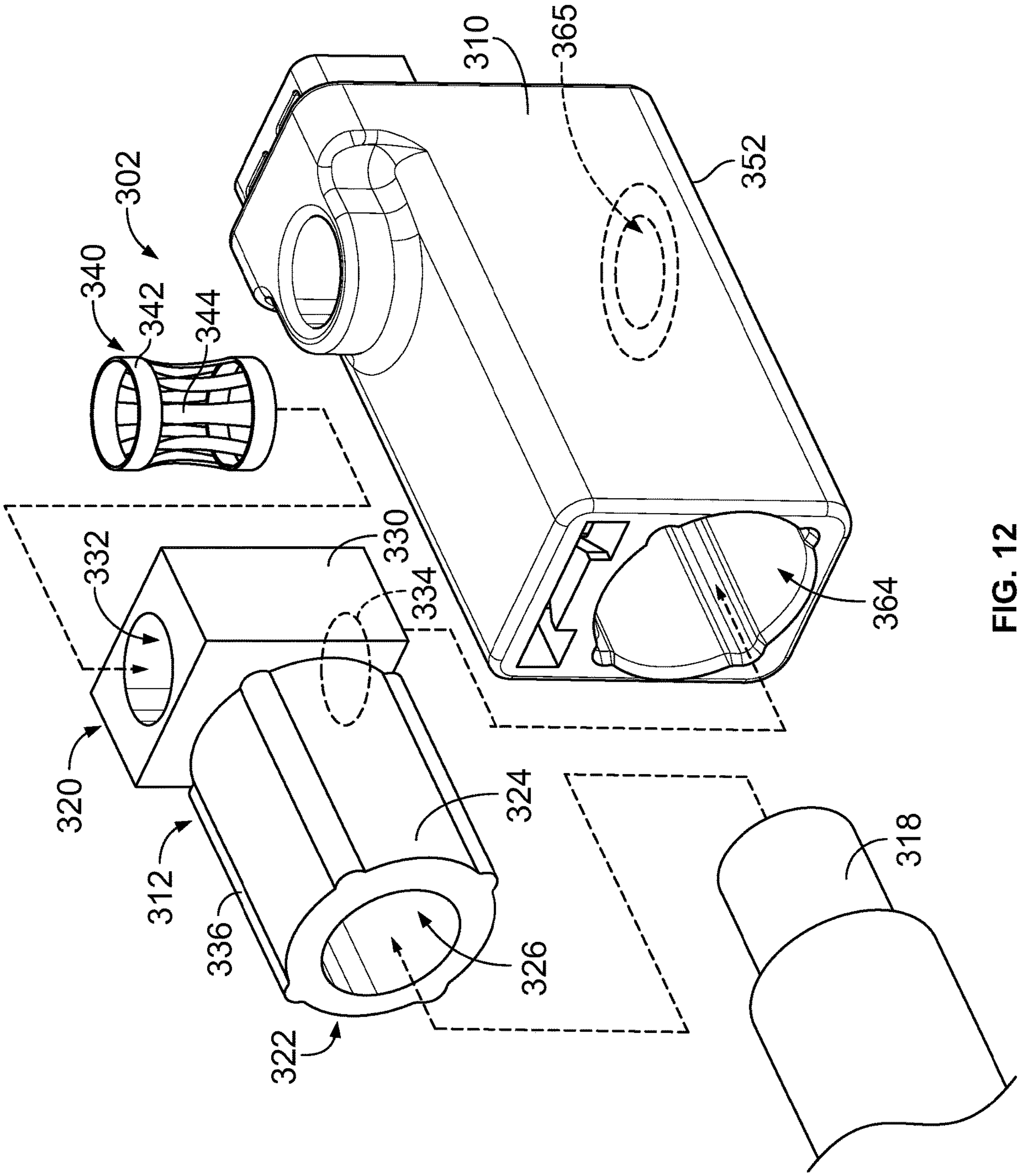
FIG. 12 is a rear perspective, exploded view of the socket connector in accordance with an exemplary embodiment.

FIG. 12 is a rear perspective, exploded view of the socket connector 302 in accordance with an exemplary embodiment. The socket connector 302 includes the housing 310 and the socket 312. The socket 312 is configured to be received in the housing 310. The sockets 312 may be positioned in the housing 310 to interface with the pin 404 (shown in FIG. 11). For example, the socket 312 may be received in the cavity 364 to electrically connect to the pin 404.

The socket 312 is configured to be electrically connected to a cable 318. The cable 318 may be a power cable. The socket 312 is manufactured from a conductive material, such as a copper or aluminum material. In various embodiments, the socket 312 is a machined part. In alternative embodiments, the socket 312 may be diecast, extruded, molded or may be a stamped and formed parts. The socket 312 extends between a mating end 320 and a terminating end 322. The terminating end 322 is configured to be coupled to the cable 318. In an exemplary embodiment, the socket 312 includes a crimp barrel 324 at the terminating end 322. The crimp barrel 324 is hollow forming a cable socket 326 that receives the cable 318. The crimp barrel 324 is configured to be crimped to the cable 318, such as using a crimping tool. The terminating end 322 may be coupled to the cable 318 by other means in alternative embodiments. For example, the terminating end 322 may include a weld pad welded to the end of the cable 318.

The socket 312 includes a main body 330 at the mating end 320. The main body 330 includes a pin socket 332 configured to receive the corresponding pin 404. The main body 330 includes an opening 334 at a bottom thereof that is open to the pin socket 332. The top of the main body 330 may additionally or alternatively include the opening 334. The top of the main body 330 may be closed in other various embodiments. In the illustrated embodiment, the pin socket 332 extends along an axis that is perpendicular to the cable 318. However, other orientations are possible in alternative embodiments. For example, the pin socket 332 may extend along an axis that is parallel to the cable 318. In an exemplary embodiment, the main body 330 includes retention features 336 used to retain the socket 312 in the housing 310. For example, the retention features 336 may be barbs or ribs formed along sides of the main body 330. Other types of retention features may be used in alternative embodiments.

In an exemplary embodiment, the socket 312 includes a torsional band contact 340 received in the pin socket 332. The torsional band contact 340 includes rings or bands 342 around the top and a bottom of the torsional band contact 340 and spring beams 344 extending between the bands 342. The spring beams 344 are deflectable relative to each other the spring beams 344 extend inward toward an interior of the torsional band contact 340. For example, the torsional band contact 340 may have an hourglass shape. The spring beams 344 include separable mating interfaces configured to engage and electrically connect to the pin 404 when the pin 404 is plugged into the pin socket 332 and the torsional band contact 340.

In an exemplary embodiment, the housing 310 includes a pin access opening 365 (shown in phantom) at the bottom 352. The pin access opening 365 provides access to the cavity 364. In an exemplary embodiment, the socket 312 is configured to be arranged in the housing 310 such that the pin socket 332 is aligned with the pin access opening 365 to receive the pin 404. In an exemplary embodiment, the housing 310 includes guide surfaces at the pin access opening 365 to guide loading of the pin 404, 406 into the pin access opening 365. For example, the guide surfaces may be angled or chamfered surfaces used to funnel the pin 404 into the pin access opening 365. The guide surfaces provide a larger catch radius for receiving the pin 404 to guide mating of the socket connector 302 with the pin connector 400.

Figure 13:
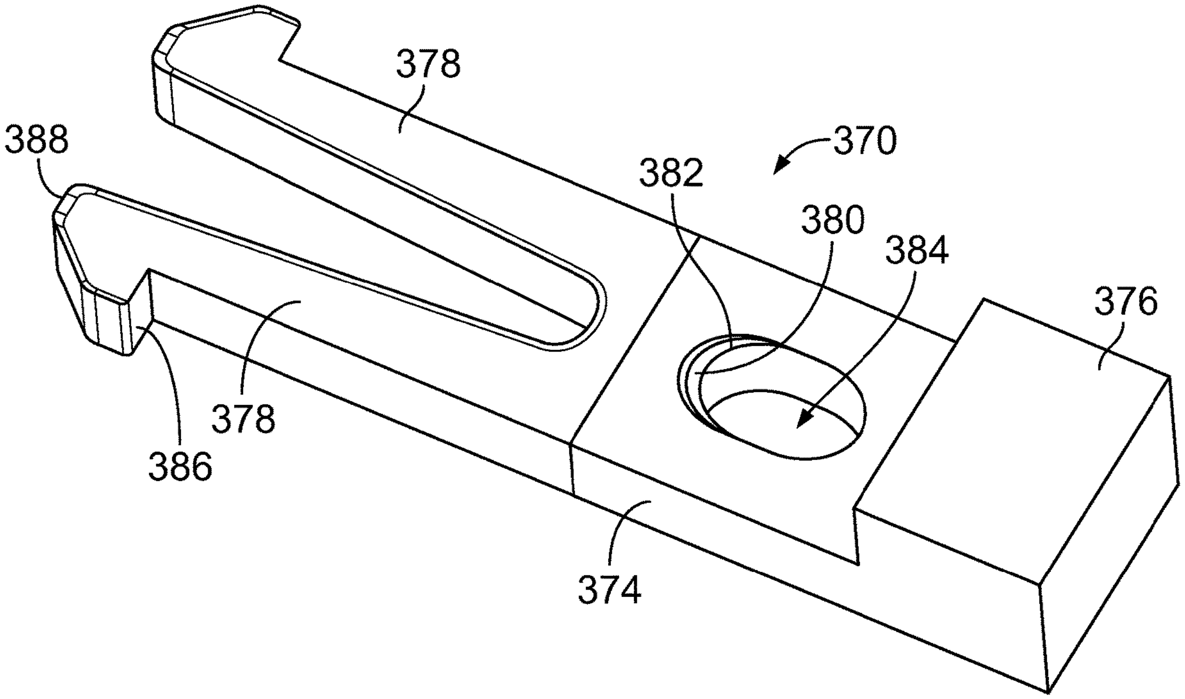
FIG. 13 is a perspective view of the latch in accordance with an exemplary embodiment.

FIG. 13 is a perspective view of the latch 370 in accordance with an exemplary embodiment. The latch 370 includes a main body 374, a latch release 376, and one or more latch arms 378. In the illustrated embodiment, the latch release 376 is provided at a front of the main body 374 and the latch arms 378 extend from a rear of the main body 374. In an exemplary embodiment, the main body 374 includes a window 384 therethrough. The window 384 is configured to receive the end of the pin 404 (shown in FIG. 11). The latch 370 is configured to be latchably coupled to the pin 404 within the window 384.

The latch release 376 may be a push button. The latch release 376 is configured to be actuated (unlatched) by pushing the latch 370 rearwardly from the latched position to the clearance position. Other types of actuating movements are possible in alternative embodiments.

In an exemplary embodiment, the latch 370 includes a latching rib 380 extending into the window 384. The latching rib 380 is located along an edge or side of the window 384, such as at the rear of the window 384. The latching rib 380 may be curved, such as to match the curvature of the pin 404. The latching rib 380 has a latching surface 382 (for example, inner edge) configured to latchably engage the corresponding pin 404. The latching rib 380 is sized and shaped to interface with the pin 404, such as to fit in the groove 420 (shown in FIG. 11). The latching rib 380 may be V-shaped in various embodiments. The latching rib 380 is movable with the latch 370, such as sliding rearwardly/forwardly between unlatched and latched positions. For example, the latching rib 380 may be moved rearward with the latch 370 to unlatch the latching rib 380 from the pin 404 when the latch release 376 is pressed/actuated.

In the illustrated embodiment, the latch 370 includes a pair of the latch arms 378. The latch arms 378 are configured to be latchably coupled to the housing 310. The latch arms 378 are deflectable. The latch arms 378 may be deflected inward (for example, toward each other) during unlatching of the socket connector 302 from the pin connector 400. The latch arms 378 may be deflected using the latch release 376, such as being squeezed inward when the latch 370 is actuated to the unlatched position. Each latch arm 378 includes a latching finger 386 at a distal end 388 of the latch arm 378. The latching finger 386 is configured to be latchably coupled to the housing 310. The latching finger 386 prevents pull-out of the latch 370 from the housing 310.

Figure 14:
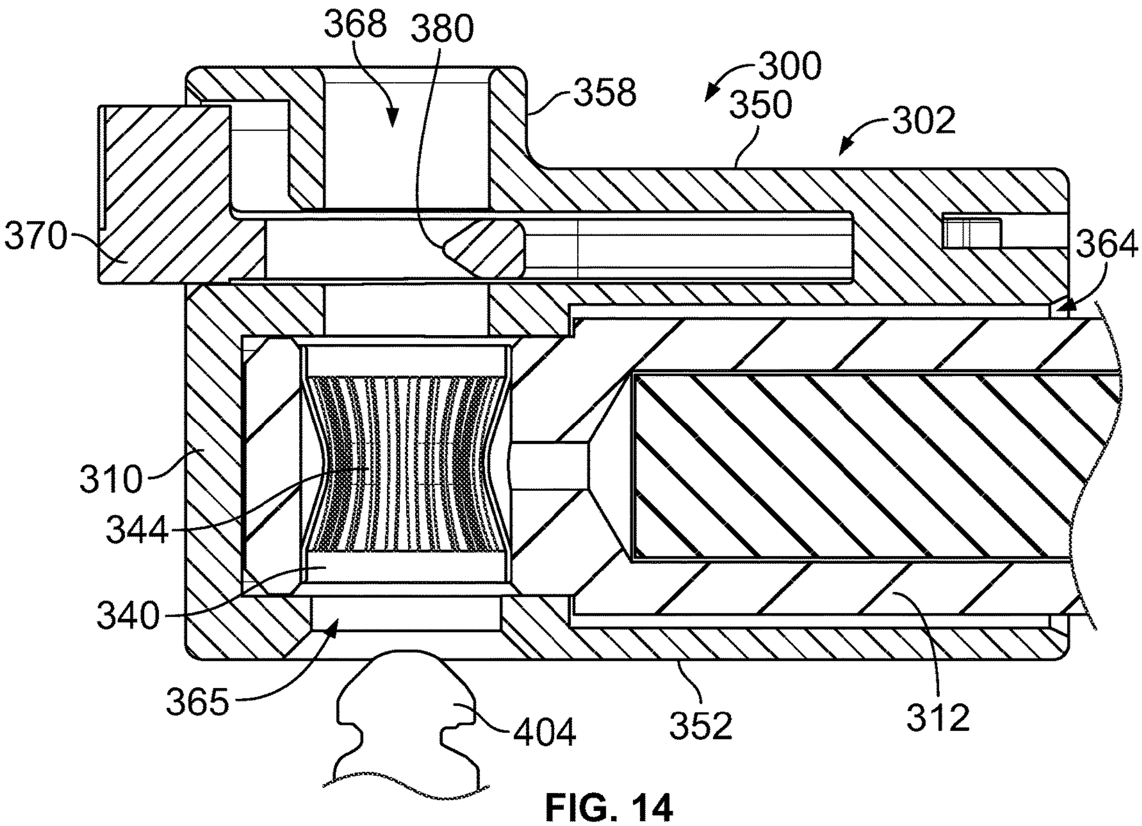
FIG. 14 is a cross sectional view of a portion of the connector system showing the socket connector poised for mating with the pin connector 40 in accordance with an exemplary embodiment.
Figure 15:
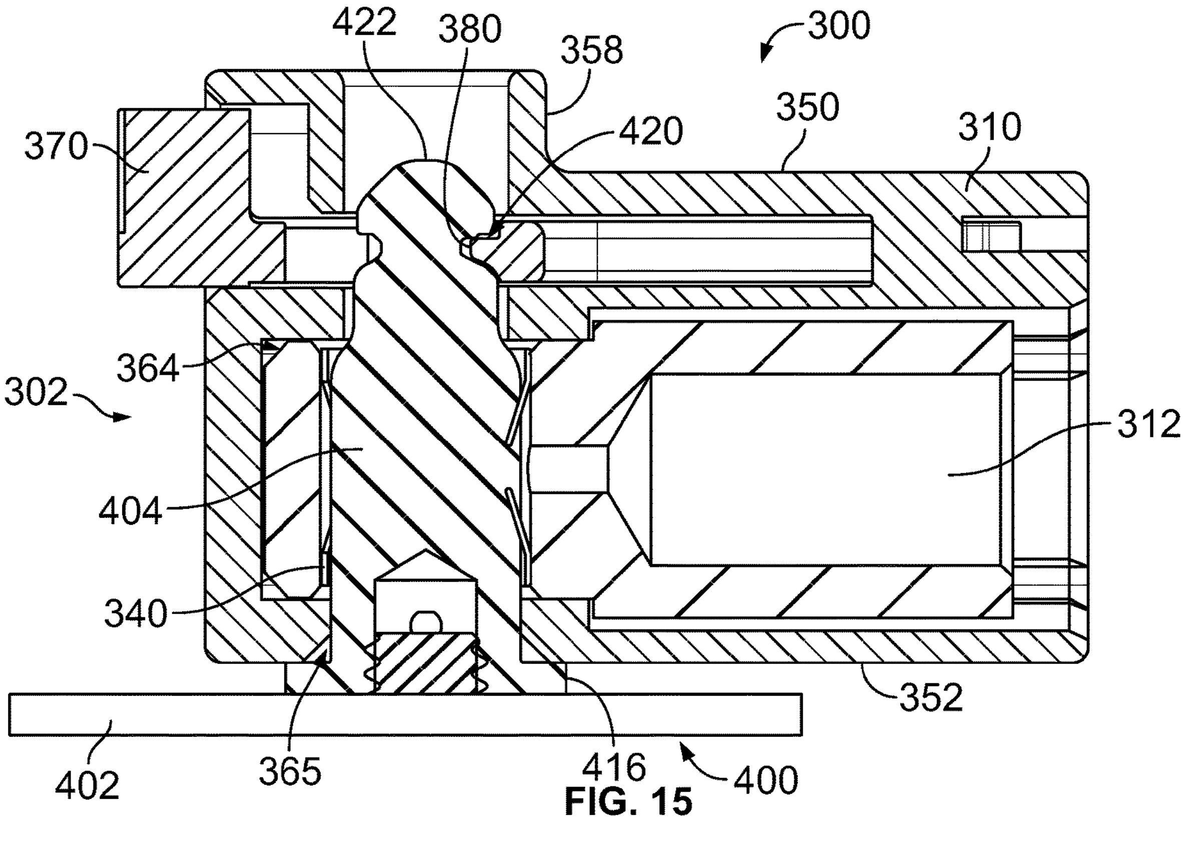
FIG. 15 is a cross sectional view of the connector system showing the socket connector coupled to the pin connector in accordance with an exemplary embodiment.

FIG. 14 is a cross sectional view of a portion of the connector system 300 showing the socket connector 302 poised for mating with the pin connector 400. FIG. 15 is a cross sectional view of the connector system 300 showing the socket connector 302 coupled to the pin connector 400. When assembled, the socket 312 is located in the cavity 364 to interface with the pin 404. The spring beams 344 of the torsional band contacts 340 extend inward into the interior spaces of the socket 312 to engage the pin 404.

During mating, the pin access opening 365 is aligned with the distal end 422 of the pin 404. The upper opening 368 allows visual alignment of the housing 310 with the pin 404. The housing 310 is lowered over the pin 404 to load the pin 404 into the cavity 364. In an exemplary embodiment, the housing 310 is lowered onto the pin connector 400 until the bottom 352 is seated on the flange 416 and/or the substrate 402. During mating, the latch 370 engages the pin 404. The pin 404 may be shaped (for example, rounded or chamfered at the top) to engage the latch 370 and actuate or move the latch to a clearance position to pass the end of the pin 404 past the latch 370, such as to align the latch 370 with the groove 420. The latch 370 may clip or snap couple to the pin 404 in the groove 420. For example, the latching rib 380 is received in the groove 420 to retain the socket connector 302 on the pin 404. In the latched position (FIG. 15), the latch 370 is received in the grooves 420 to secure the socket connector 302 to the pin connector 400. The latch 370 is used to lock the socket connector 302 onto the pin 404 without the need for separate mounting hardware, such as fasteners used to secure the housing 310 to the substrate 402. As such, the housing 310 may be manufactured with a narrow width. For example, the walls along the cavity 364 outside of the pin 404 may be relatively thin, leading to a small footprint for the socket connector 302, which allows other components to be provide on the substrate 402 in close proximity to the pin 404 (particularly when compared to a housing having mounting lugs or other mounting features along the sides of the housing 310 used for mounting the socket connector 302 to the substrate 402).

In an exemplary embodiment, the housing 310 includes a tower or extension 358 at the top 350 of the housing 310. The extension 358 elevates the upper opening 368 a safe distance above the distal end 422 of the pin 404. The extension 358 makes the housing 310 touch-safe by preventing inadvertent touching or shorting to the pin 404.

Figure 16:
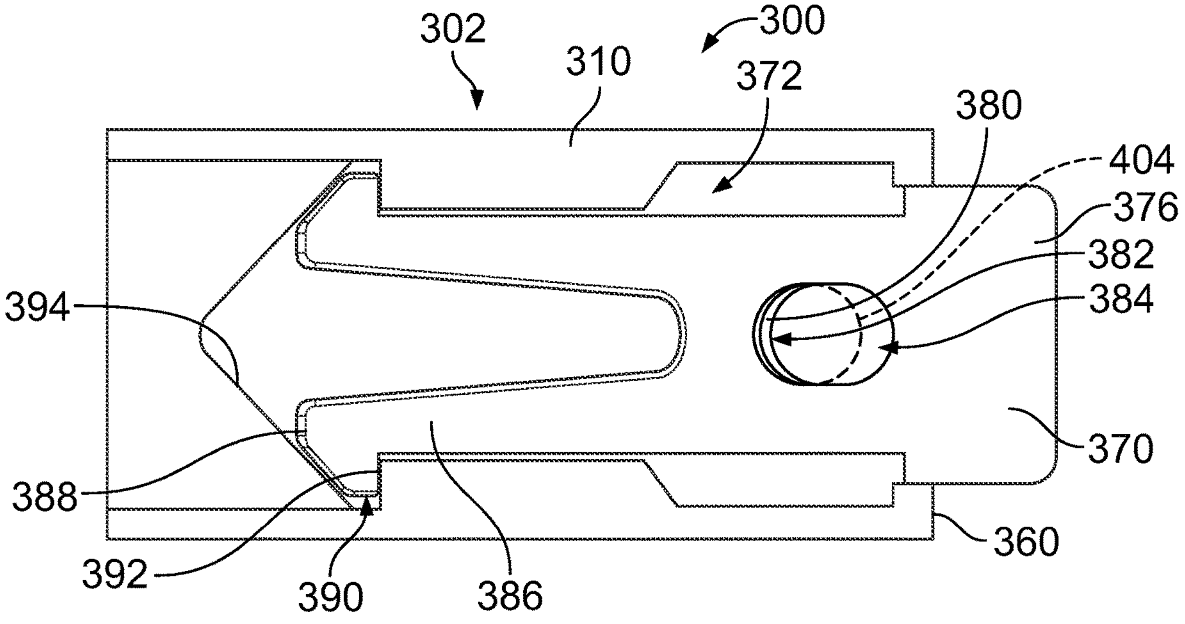
FIG. 16 is a cross sectional view of a portion of the connector system showing the socket connector coupled to the pin connector with the latch in a latched position in accordance with an exemplary embodiment.
Figure 17:
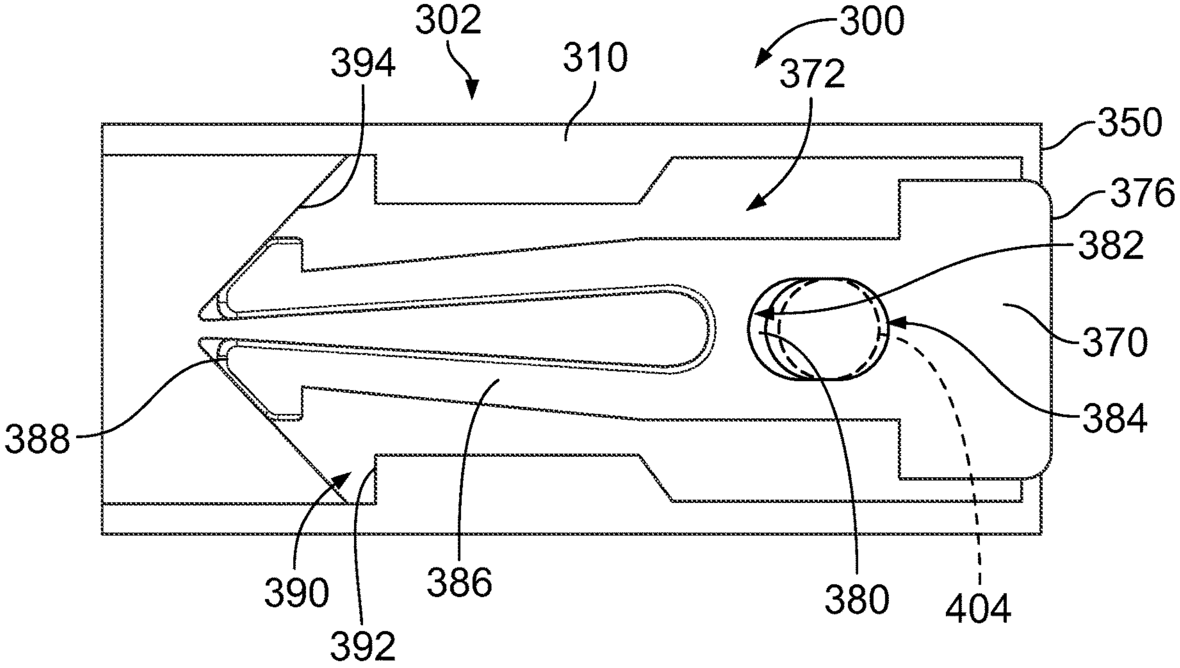
FIG. 17 is a cross sectional view of the connector system showing the socket connector coupled to the pin connector with the latch in a clearance position in accordance with an exemplary embodiment.

FIG. 16 is a cross sectional view of a portion of the connector system 300 showing the socket connector 302 coupled to the pin connector 400 with the latch 370 in a latched position. FIG. 17 is a cross sectional view of the connector system 300 showing the socket connector 302 coupled to the pin connector 400 with the latch 370 in a clearance position. The pin 404 is shown in phantom in FIGS. 16 and 17.

The latch 370 is movably received in the latch pocket 372. For example, the latch 370 may be pressed inward to release the latch 370 from the pin 404 of the pin connector 400. The latch 370 is guided between the latched position and the clearance position by the housing 310 in the latch pocket 372. In the latched position, the latch 370 engages the pin 404 to prevent pull off or separation of the socket connector 302 from the pin connector 400. The latch release 376 is exposed at the exterior of the housing 310, such as at the front 360 of the housing 310. The latch release 376 is actuated (unlatched) by pushing the latch 370 inward from the latched position to the clearance position. Other types of actuating movements are possible in alternative embodiments.

In an exemplary embodiment, the latching finger 386 is configured to be latchably coupled to the housing 310. For example, the latching finger 386 may be received in a notch 390 in the housing 310 to engage a catch surface 392 of the housing 310. The latching finger 386 prevents pull-out of the latch 370 from the housing 310. In an exemplary embodiment, the housing 310 includes a ramp surface 394 at the rear of the latch pocket 372. The distal end 388 of the latch arm 378 engages the ramp surface 394. The ramp surface 394 is configured to deflect the latch arm 378 inward as the distal end 388 rides along the ramp surface 394. For example, as the latch 370 is actuated (pressed rearward to the clearance position), the distal end 388 slides along the ramp surface 394 to deflect the latch arm 378 inward. The deflection elastically deforms the latch arm 378 creating an internal spring force or biasing force in the latch arm 378. When the latch release 376 is released, the latch arms 378 spread out to return to the undeflected state, which causes the distal ends 388 of the latch arms 378 to ride up the ramp surfaces 394 and return the latch 370 to the latched position.

In an exemplary embodiment, the latch arms 378 may be deflected automatically (for example, without pressing the latch release 376), such as by the pin 404 during mating of the socket connector 302 to the pin connector 400. For example, as the socket connector 302 is pressed downward onto the pin connector 400, the distal ends of the pin 404 (which may be rounded) engages a lead-in ramp on the latching rib 380 to shift the latch 370 rearward and deflect the latch arms 378 inward.

The latching rib 380 is movable with the latch 370 from the latched position (FIG. 16) to the clearance position (FIG. 17). The latching surface 382 is configured to latchably engage the pin 404 in the latched position. For example, the latching rib 380 is sized and shaped to fit in the groove 420 of the pin 404. The latching surface 382 engages the pin 404 to secure the socket connector 302 on the pin connector 400.

In an exemplary embodiment, the window 384 is elongated or oval shaped to allow the latch 370 to move relative to the pin 404. For example, the latch 370 is moved rearward from the latching position to the actuated or clearance position. The latching rib 380 is shifted rearward out of the groove 420 when the latch 370 is moved to the unlatched position. The latching rib 380 is disengaged from (unlatched from) the pin 404 in the clearance position. The socket connector 302 is able to move vertically along the pin 404 in the clearance position when the front portion of the window 384 is aligned with the pin 404.

The latch release 376 is easily accessible from the exterior of the housing 310 to allow quick and easy unlatching of the socket connector 302 from the pin connector 400. The latch 370 is slid in a linear actuation direction (for example, rearward) when the latch release 376 is actuated. The sliding movement of the latch 370 releases the latching rib 380 from the pin 404, such as by positioning the pin 404 in the open part of the window, to release the latch 370 from connection with the pin 404. Thus, the socket connector 302 may be removed from the pin 404 without obstruction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A socket connector comprising:

a housing having a top, a bottom, a first side wall and a second side wall, the housing having a front and a rear, the housing including a cavity, the housing including a pin access opening through the bottom open to the cavity configured to receive a pin, the housing including a latch pocket open to the cavity;

a socket received in the cavity and configured to be electrically connected to the pin, the socket having a terminating end configured to be coupled to a cable, the socket having a pin socket, the pin socket being aligned with the pin access opening of the housing to receive the pin, the socket configured to electrically connect the cable and the pin; and a latch movably received in the latch pocket and configured to engage the pin to secure the socket connector to the pin, the latch including a latch release accessible exterior of the housing to release the latch, the latch including a latching rib having a latching surface, the latch release moving the latch between a latched position and a clearance position, the latching rib configured to engage the pin in the latched position, the latching rib being released from the pin in the clearance position to allow uncoupling of the socket connector from the pin;

wherein the latch includes a main body having a window configured to receive the pin, the latching rib extending into the window to interface with the pin, the latching rib including a lead-in ramp configured to engage the pin to actuate the latch from the latching position to the clearance position when the lead in ramp engages the pin during mating with the pin.

2. The socket connector of claim 1, wherein the latch includes a main body, the latch release extending from a front of the main body, a latch arm extending from a rear of the main body being latchably coupled to the housing.

3. The connector system of claim 1, wherein the latch includes a window between the latching rib and the latch release, the window being aligned with the pin in the clearance position.

4. The socket connector of claim 1, wherein the latch is slidable in a linear actuation direction in the latch pocket between the latched position and the clearance position, the linear actuation direction being perpendicular to the pin.

5. The socket connector of claim 1, wherein the latch includes a latch arm, the latch arm having a latching finger at a distal end of the latch arm, the latching finger being coupled to the housing.

6. The socket connector of claim 5, wherein the housing includes a ramp surface at a rear of the latch pocket, a distal end of the latch arm engaging the ramp surface, the latch arm be deflected by the ramp surface when the latch release is pressed and the latch is moved to the clearance position, the latch arm moving along the ramp surface to return the latch to the latched position when the latch release is released.

7. The socket connector of claim 1, wherein the cavity is open at the top to view the pin in the cavity.

8. The socket connector of claim 1, wherein the housing completely encloses the socket forming a touch safe covering for the socket.

9. The socket connector of claim 1, wherein the latch includes a latch arm, the latch arm having a latching finger at a distal end of the latch arm, the latching finger being coupled to the housing, the housing including a ramp surface at a rear of the latch pocket, a distal end of the latch arm engaging the ramp surface, the latch arm be deflected by the ramp surface when the latch release is pressed and the latch is moved to the clearance position, the latch arm moving along the ramp surface to return the latch to the latched position when the latch release is released.

10. A socket connector comprising:

a housing having a top, a bottom, a first side wall and a second side wall, the housing having a front and a rear, the housing including a cavity, the housing including a pin access opening through the bottom open to the cavity configured to receive a pin, the housing including a latch pocket open to the cavity, the housing including a ramp surface extending into the latch pocket;

a socket received in the cavity and configured to be electrically connected to the pin, the socket having a terminating end configured to be coupled to a cable, the socket having a pin socket, the pin socket being aligned with the pin access opening of the housing to receive the pin, the socket configured to electrically connect the cable and the pin; and a latch movably received in the latch pocket and configured to engage the pin to secure the socket connector to the pin, the latch including a latch release accessible exterior of the housing to release the latch, the latch including a latching rib having a latching surface, the latch including a latch arm engaging the ramp surface, the latch release moving the latch between a latched position and a clearance position, the latching rib configured to engage the pin in the latched position, the latching rib being released from the pin in the clearance position to allow uncoupling of the socket connector from the pin, wherein the latch arm is deflected by the ramp surface when the latch release is pressed and moved to the clearance position, the latch arm moving along the ramp surface to return the latch to the latched position when the latch release is released;

wherein the latch includes a main body having a window configured to receive the pin, the latching rib extending into the window to interface with the pin, the latching rib including a lead-in ramp configured to engage the pin to actuate the latch from the latching position to the clearance position when the lead in ramp engages the pin during mating with the pin.

11. The socket connector of claim 10, wherein the latch is slidable in a linear actuation direction in the latch pocket between the latched position and the clearance position, the linear actuation direction being perpendicular to the pin.

12. The socket connector of claim 10, wherein the cavity is open at the top to view the pin in the cavity.

13. The socket connector of claim 10, wherein the housing completely encloses the socket forming a touch safe covering for the socket.

14. A connector system comprising:

a pin connector having a substrate holding a pin, the pin including a mating end having a groove; and a socket connector removably coupled to the pin of the pin connector, the socket connector comprising:

a housing having a top, a bottom, a first side wall and a second side wall, the housing having a front and a rear, the housing including a cavity, the housing including a pin access opening through the bottom open to the cavity configured to receive the pin, the housing including a latch pocket open to the cavity;

a socket received in the cavity, the socket having a terminating end configured to be coupled to a cable, the socket having a pin socket aligned with the pin access opening of the housing to receive the pin, the pin socket being electrically connected to the pin to electrically connect the pin to the cable; and a latch movably received in the latch pocket between a latched position and a clearance position, the latch having a latching rib received in the groove of the pin to secure the socket connector to the pin in the latched position, the latch including a latch release accessible exterior of the housing to release the latch from the latched position to the clearance position, the latching rib being released from the pin in the clearance position to allow uncoupling of the socket connector from the pin;

wherein the latch includes a main body having a window configured to receive the pin, the latching rib extending into the window to interface with the pin, the latching rib including a lead-in ramp configured to engage the pin to actuate the latch from the latching position to the clearance position when the lead in ramp engages the pin during mating with the pin.

15. The connector system of claim 14, wherein the window is located between the latching rib and the latch release, the window being aligned with the pin in the clearance position.

16. The connector system of claim 14, wherein the latch is slidable in a linear actuation direction in the latch pocket between the latched position and the clearance position, the linear actuation direction being perpendicular to the pin.

17. The connector system of claim 14, wherein the cavity is open at the top to view the pin in the cavity.

18. The connector system of claim 14, wherein the housing completely encloses the socket forming a touch safe covering for the socket.

* * * * *